United States Patent
Oh et al.

(10) Patent No.: US 9,380,477 B2
(45) Date of Patent: Jun. 28, 2016

(54) TERMINAL, AND SYSTEM AND METHOD FOR MONITORING WIRELESS NETWORK

(71) Applicant: SAMSUNG SDS CO., LTD., Seoul (KR)

(72) Inventors: Kyoung Jin Oh, Seoul (KR); Kyung Seung Lee, Goyang-si (KR); Min Ah Park, Siheung-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 191 days.

(21) Appl. No.: 14/012,189

(22) Filed: Aug. 28, 2013

(65) Prior Publication Data
US 2014/0105045 A1    Apr. 17, 2014

(30) Foreign Application Priority Data
Oct. 11, 2012    (KR) .......................... 10-2012-0113027

(51) Int. Cl.
| | |
|---|---|
| *H04W 24/08* | (2009.01) |
| *H04B 17/309* | (2015.01) |
| *H04L 1/00* | (2006.01) |
| *H04B 17/14* | (2015.01) |
| *H04B 17/391* | (2015.01) |

(52) U.S. Cl.
CPC .............. *H04W 24/08* (2013.01); *H04B 17/309* (2015.01); *H04L 1/0002* (2013.01); *H04L 1/0014* (2013.01); *H04L 1/0026* (2013.01); *H04B 17/14* (2015.01); *H04B 17/391* (2015.01)

(58) Field of Classification Search
CPC ...... H04L 47/115; H04L 47/283; H04L 47/10
USPC ................................... 370/252, 235, 236, 468
See application file for complete search history.

(56) References Cited

U.S. PATENT DOCUMENTS

| | | | |
|---|---|---|---|
| 2007/0217448 A1* | 9/2007 | Luo ......................... | H04L 47/10 370/468 |
| 2008/0080465 A1* | 4/2008 | Pajukoski ............. | H04L 1/0016 370/342 |
| 2009/0022061 A1* | 1/2009 | Walley ................ | H04L 41/5003 370/252 |

OTHER PUBLICATIONS

Lao et al., "The probe gap model can underestimate the available bandwidth of multihop paths", ACM SIGCOMM Computer Communication Review Homepage archive, vol. 36 Issue 5, Oct. 2006, pp. 29-34.*

* cited by examiner

*Primary Examiner* — Redentor Pasia
*Assistant Examiner* — Peter Mak
(74) *Attorney, Agent, or Firm* — Sughrue Mion, PLLC

(57) ABSTRACT

Provided are a terminal and a system and method for monitoring a wireless network. The system for monitoring a wireless network includes: a first terminal including: a packet gap model (PGM) transmission unit for transmitting a plurality of measurement packets at a previously calculated transmission time interval; and a channel quality indicator (CQI) unit for acquiring information regarding channel quality of a wireless communication channel to measure an assured maximum increment of speed of the network; a second terminal including a PGM reception unit for receiving the measurement packets and measuring a non-assured maximum possible speed of the network from a reception time interval of the received measurement packets; and a wireless access point connected with the first terminal through the wireless communication channel.

17 Claims, 9 Drawing Sheets

FIG. 7

| VARIANCE | Measured in accordance with an existing PGM scheme | | Measured in accordance with a CQI scheme of an embodiment of the present disclosure | |
| --- | --- | --- | --- | --- |
| | Under no cross traffic | Under cross traffic | Under no cross traffic | Under cross traffic |
| 1st measurement | 1.43 | 1.22 | 0.16 | 0.05 |
| 2nd measurement | 2.01 | 0.97 | 0.81 | 0.44 |
| 3rd measurement | 2.07 | 3.30 | 0.61 | 0.28 |
| 4th measurement | 0.67 | 1.40 | 0.11 | 0.59 |

TERMINAL, AND SYSTEM AND METHOD FOR MONITORING WIRELESS NETWORK

CROSS-REFERENCE TO RELATED APPLICATION

This application claims priority to and the benefit of Republic of Korea Patent Application No. 10-2012-0113027, filed on Oct. 11, 2012, the disclosure of which is incorporated herein by reference in its entirety.

BACKGROUND

1. Field

The present disclosure relates to wireless network monitoring technology, and more particularly, to a terminal that monitors a network state using a combination of a packet gap model (PGM) scheme and a channel quality indicator (CQI) scheme, and a system and method for monitoring a wireless network using the terminal.

2. Discussion of Related Art

Wireless network monitoring technology is used to provide a reliable service in a wireless communication environment. For example, a streaming service involves a wireless network monitoring technique for monitoring a network state (e.g., an available network bandwidth or network speed) and based on the current network state, selecting an appropriate media source to be transmitted.

FIG. 1 is a diagram illustrating a common wireless network monitoring technique. FIG. 1 shows a videophone service in which an appropriate image source is selected according to a network state and transmitted.

As shown in FIG. 1, when a first terminal 10 performs a video call with a second terminal 20, the first terminal 10 transmits low-quality video or high-quality video to the second terminal 20 according to a network state obtained through network monitoring. These video sources, i.e., the low-quality video and the high-quality video, should be transmitted at rates of, for example, 700K bits per second or higher and 1.2M bits per second or higher, respectively, for proper playback. The low-quality video and the high-quality video may be generated at the first terminal 10 according to an encoding option.

The first terminal 10 determines, based on the network monitoring results, whether, given a current network state (e.g., an available network bandwidth), only the low-quality video can be processed or even the high-quality video can be as well, selects an appropriate video source from the low-quality video and the high-quality video according to the determination, and transmits the selected video source to the second terminal 20.

However, according to an existing network monitoring scheme, the first terminal 10 transmits measurement packets, i.e., additional packets for measuring a state of a network, to the second terminal 20. In other words, when such existing network monitoring scheme is employed, the first terminal 10 transmits at least two measurement packets to the second terminal 20, and then the second terminal 20 calculates a reception interval between two measurement packets for monitoring the network state. Such network monitoring scheme is referred to as a PGM scheme.

The existing PGM scheme facilitates measurement of both of a non-assured maximum possible speed (a maximum speed available for a service in a current network state) and an assured maximum increment of speed (a maximum speed-up available for one of services with respect to a current network speed for the services without any change in the other services) of the network.

However, the existing PGM scheme may result in a delay in the measurement under a network environment (e.g., a degree of network congestion, communication capacity at a bottleneck, and a probability of loss of a measurement packet) since measurement packets are to be transmitted for network monitoring. Therefore, the network monitoring requires much time for the measurement and leads to a reduced accuracy and reliability of the measurement results.

SUMMARY

One or more exemplary embodiments may overcome the above disadvantage and/or other disadvantages not described above. However, it is understood that one or more exemplary embodiment are not required to overcome the disadvantage described above, and may not overcome any of the problems described above.

Embodiments of the present disclosure are directed to a terminal that rapidly performs network monitoring with an improved accuracy and reliability of the network monitoring results, and a system and method for monitoring a wireless network using the terminal.

According to an exemplary embodiment, there is provided a terminal, intended for use in performing data communications with another terminal through a wireless access point over a network, including a computing device with a transmitter and a receiver, the terminal implementing: a packet gap model (PGM) unit, implemented by the computing device, configured to: transmit a plurality of measurement packets to the said another terminal at a previously calculated transmission time interval; and receive, from the other terminal, a value of a non-assured maximum possible speed of the network; and a channel quality indicator (CQI) unit, implemented by the computing device, configured to acquire information regarding channel quality of a wireless communication channel over which the terminal is connected with the wireless access point to measure an assured maximum increment of speed of the network.

In an aspect of the terminal, the PGM unit is further configured to: receive, from the CQI unit, a value of a maximum transmission rate of a physical layer of the network; and calculate the transmission time interval based on the value of the maximum transmission rate; and the value of the maximum transmission rate is contained in the channel quality information.

In an aspect of the terminal, the PGM unit is further configured to calculate the transmission time interval using the following equation:

$$G_S = \frac{100L}{C \times \alpha}$$

where: $G_S$ denotes a transmission time interval, L denotes a size of a measurement packet, C denotes a maximum transmission rate of a physical layer of a network, and $\alpha$ denotes a ratio of a transmission rate experienced in a network layer of a terminal to a maximum transmission rate supported by a physical layer of the terminal.

In an aspect of the terminal, the CQI unit is further configured to calculate the assured maximum increment of speed using the following equation:

$$V_{CQI} = \left(C \times \frac{\alpha}{100}\right) \times (1 - \text{Channel Utilization})$$

where: $V_{CQI}$ denotes an assured maximum increment of speed, C denotes a maximum transmission rate of a physical layer of a network, and α denotes a ratio of a transmission rate experienced in a network layer of a terminal to a maximum transmission rate supported by a physical layer of the terminal.

In an aspect of the terminal, the CQI unit is further configured to correct a value of α using a value of a reception rate of the measurement packets transmitted by the PGM unit at minimum intervals.

In an aspect of the terminal, the PGM unit is further configured to receive, from the CQI unit, the value of the maximum transmission rate of the physical layer of the network and the corrected value of α to calculate the transmission time interval.

According to another exemplary embodiment, there is provided a system for monitoring a wireless network, comprising: a first terminal including: a packet gap model (PGM) transmission unit configured to transmit a plurality of measurement packets at a previously calculated transmission time interval; and a channel quality indicator (CQI) unit configured to acquire information regarding channel quality of a wireless communication channel to measure an assured maximum increment of speed of the network; a second terminal including a PGM reception unit configured to: receive the measurement packets; and measure a non-assured maximum possible speed of the network from a reception time interval of the received measurement packets; and a wireless access point connected with the first terminal through the wireless communication channel.

In an aspect of the system, the PGM transmission unit is further configured to: receive, from the CQI unit, a value of a maximum transmission rate of a physical layer of the network; and calculate the transmission time interval, based on the value of the maximum transmission rate; wherein the value of the maximum transmission rate is contained in the channel quality information.

In an aspect of the terminal, the PGM transmission unit is further configured to calculate the transmission time interval using the following equation:

$$G_S = \frac{100L}{C \times \alpha}$$

where: $G_S$ denotes a transmission time interval, L denotes a size of a measurement packet, C denotes a maximum transmission rate of a physical layer of a network, and α denotes a ratio of a transmission rate experienced in a network layer of a terminal to a maximum transmission rate supported by a physical layer of the terminal.

In an aspect of the terminal, the CQI unit is further configured to calculate the assured maximum increment of speed using the following equation:

$$V_{CQI} = \left(C \times \frac{\alpha}{100}\right) \times (1 - \text{Channel Utilization})$$

where: $V_{CQI}$ denotes an assured maximum increment of speed, C denotes a maximum transmission rate of a physical layer of a network, and α denotes a ratio of a transmission rate experienced in a network layer of a terminal to a maximum transmission rate supported by a physical layer of the terminal.

In an aspect of the terminal, the CQI unit is further configured to correct a value of α using a value of a reception rate of the measurement packets transmitted by the PGM transmission unit at minimum intervals.

In an aspect of the terminal, the PGM transmission unit is further configured to receive, from the CQI unit, the value of the maximum transmission rate of the physical layer of the network and the corrected value of α to calculate the transmission time interval.

In an aspect of the terminal, the PGM reception unit is further configured to transmit the value of the non-assured maximum possible speed of the network to the PGM transmission unit.

According to yet another exemplary embodiment, there is provided a method of monitoring a wireless network, comprising: calculating, with a packet gap model (PGM) transmission unit, a transmission time interval between measurement packets based on: a default value of α, which is a ratio of a transmission rate experienced in a network layer of a terminal to a maximum transmission rate supported by a physical layer of the terminal, and a value of a maximum transmission rate of a physical layer of the network, wherein the value of the maximum transmission rate is received from a channel quality indicator (CQI) unit; transmitting, with the PGM transmission unit, the measurement packets to a PGM reception unit at the calculated transmission time interval; and measuring, with the PGM reception unit, a reception interval between the measurement packets to calculate a non-assured maximum possible speed of the network.

In an aspect of the method, the method also includes, after transmitting the measurement packets to the PGM reception unit: transmitting, with the PGM transmission unit, measurement packets to the PGM reception unit at a minimum transmission time interval; checking, with the PGM transmission unit, whether or not a corrected value of α is delivered from the CQI unit; when the corrected value of α is delivered from the CQI unit, updating, at the PGM transmission unit, the transmission time interval between measurement packets using: the corrected value of α, and the value of the maximum transmission rate of the physical layer of the network; transmitting, with the PGM transmission unit, measurement packets to the PGM reception unit at the updated transmission time interval; and measuring, with the PGM reception unit, a reception interval between the measurement packets to update the non-assured maximum possible speed.

According to still another exemplary embodiment, there is provided a method of monitoring a wireless network, comprising: correcting, using a channel quality indicator (CQI) unit of a terminal having a computing device with a transmitter and a receiver, a value of α, which is a ratio of a transmission rate experienced in a network layer of a terminal to a maximum transmission rate supported by a physical layer of the terminal, using a value of a reception rate of measurement packets transmitted at minimum transmission time intervals; and calculating, at the CQI unit, an assured maximum increment of speed of the network using the corrected value of α and acquired information regarding channel quality of a wireless channel.

In an aspect of the method, calculating the assured maximum increment of speed includes: acquiring, with the CQI unit, a maximum transmission rate of a physical layer of the network, a channel active time, and a channel busy time contained in the channel quality information; and calculating, with the CQI unit, the assured maximum increment of speed based on the corrected value of α, the maximum transmission rate of the physical layer of the network, the channel active time, and the channel busy time.

BRIEF DESCRIPTION OF THE DRAWINGS

The above and other objects, features and advantages of the exemplary embodiments of the present disclosure will become more apparent to those skilled in the art from the following detailed description when taken in conjunction with the accompanying drawings, in which:

FIG. 7 is a table for comparing a variance of an assured maximum increment of speed according to a CQI scheme of the present disclosure with a variance of an assured maximum increment of speed according to an existing PGM scheme;

DETAILED DESCRIPTION OF EXEMPLARY EMBODIMENTS

Figure 1:
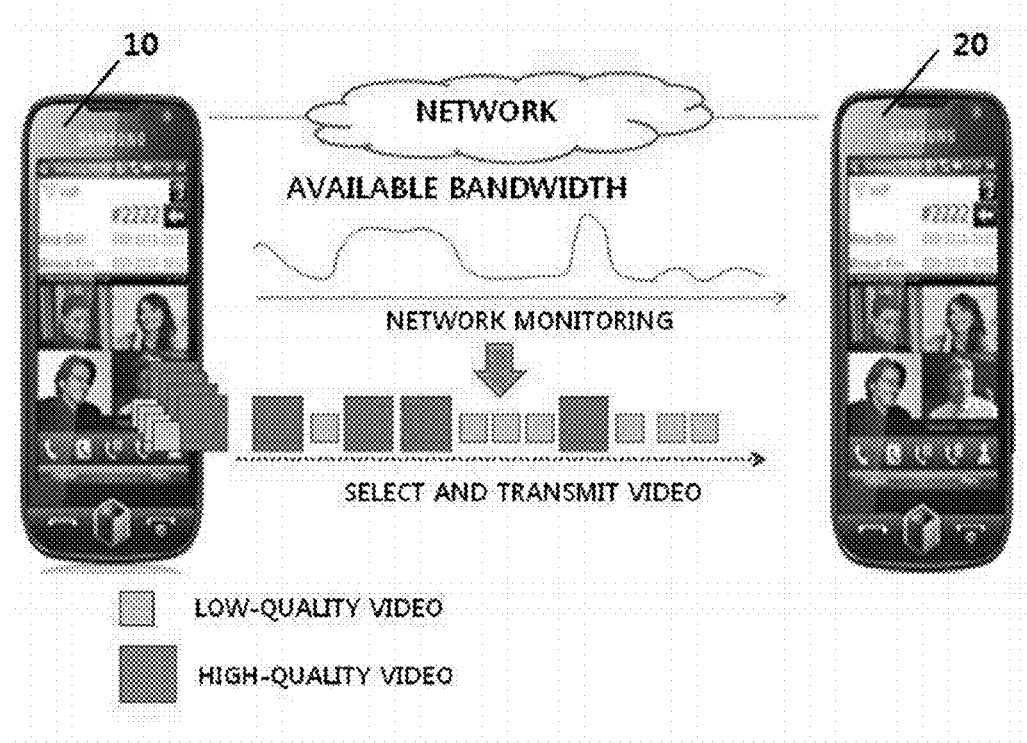
FIG. 1 is a diagram illustrating a common wireless network monitoring technique.

Hereinafter, exemplary embodiments of the present disclosure will be described in detail with reference to the accompanying drawings. However, the exemplary embodiments are only illustrative and are not to be construed as limiting the present disclosure.

Various details already understood by those familiar with this field will be omitted to avoid obscuring the gist of the present disclosure. Terminology described below is defined with reference to functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided to efficiently describe the spirit of the present disclosure to those skilled in the art.

In exemplary embodiments of the present disclosure, a network speed of a network is measured through network monitoring. The measured network speed may be converted into a different variable related to the network monitoring (e.g., an available network bandwidth). The measured network speed includes a non-assured maximum possible speed and an assured maximum increment of speed. The non-assured maximum possible speed denotes a maximum speed available for a service in a current network state. The assured maximum increment of speed denotes a maximum speed-up available for one of services with respect to a current network speed of the services without any change in the other services.

For example, when a wireless network system follows Institute of Electrical and Electronics Engineers (IEEE) 802.11g, a possible maximum speed of the underlying network is 54 Mbps. However, this maximum network speed is merely an ideal one, and in an actual network environment where a service is provided, the ideal maximum speed is not achieved while a non-assured maximum possible speed, which is a maximum speed available for a service in a current network state, ranges from about 50 to 60% of 54 Mbps.

Further, when 30 Mbps is used for all services in the network having a maximum speed of 54 Mbps (e.g., IEEE 802.11g), an assured maximum increment of speed (i.e., a maximum speed-up available for one of the services with respect to the current network speed for the services without any change in the other services) is 24 Mbps.

In exemplary embodiments of the present disclosure, a combination of a packet gap model (PGM) scheme and a channel quality indicator (CQI) scheme are used to measure a non-assured maximum possible speed and an assured maximum increment of speed. The PGM scheme generally refers to a methodology in which a transmitting end transmits at least two measurement packets for network monitoring, and a receiving end performs the network monitoring by measuring a reception interval between the measurement packets. Also, the CQI scheme generally refers to a methodology in which a terminal performs network monitoring based on channel quality information, i.e., information regarding channel quality of a wireless channel over which the terminal with a wireless access point (AP) (e.g., a wireless Internet sharer or a router).

In exemplary embodiments of the present disclosure, a non-assured maximum possible speed of a network is measured using the PGM scheme, and an assured maximum increment of speed is measured using the CQI scheme. Although both of the non-assured maximum possible speed and the assured maximum increment of speed of the network may be measured using the PGM scheme, exemplary embodiments of the present disclosure involve measuring the non-assured maximum possible speed of the network through the PGM scheme, and the assured maximum increment of speed through the CQI scheme. This combinatorial scheme allows more rapid and accurate measurement of an assured maximum increment of speed than the PGM scheme.

In the PGM scheme, a protocol for use in a network layer (or an application layer) of a service is applied to transmission of measurement packets. The PGM scheme does not involve separately obtaining information on an underlying network system (e.g., a wireless local area network (WLAN) system, a Third Generation (3G) system, a Long Term Evolution (LTE) system, or a wireless broadband (WiBro) system) for network monitoring, and thus can be used regardless of a network communication environment.

On the other hand, in the CQI scheme, channel quality information is obtained in a process of wirelessly communicating with the corresponding network system (e.g., a WLAN system, a 3G system, a LTE system, or a WiBro system) to perform network monitoring. Since no measurement packets are transmitted for network monitoring, almost no delay is caused by transmission of measurement packets, and it is possible to monitor a network state even when measurement packets cannot be transmitted.

As described above, each of the PGM scheme and the CQI scheme has its characteristics and, accordingly, brings its own pros and cons. Hence, exemplary embodiments of the present disclosure exploit the characteristics of the PGM scheme and the CQI scheme in a complementary manner. For example, during the measurement of a non-assured maximum possible speed through the PGM scheme, it may be determined at what rate measurement packets are to be transmitted (or at what time interval measurement packets are to be transmitted) based on channel quality information provided from CQI. Also, during the measurement of an assured maximum increment of speed through the CQI scheme, the results derived from the PGM scheme may be used for correcting a value of α (a ratio of a transmission rate experienced in a network layer to a maximum transmission rate supported by a physical layer).

With reference to FIG. 2 to FIG. 9, an illustrative description of a terminal and a system and method for monitoring a wireless network using the terminal in accordance with exemplary embodiments of the present disclosure is presented below. However, these embodiments are merely illustrative, and the present disclosure is not limited thereto.

Figure 2:
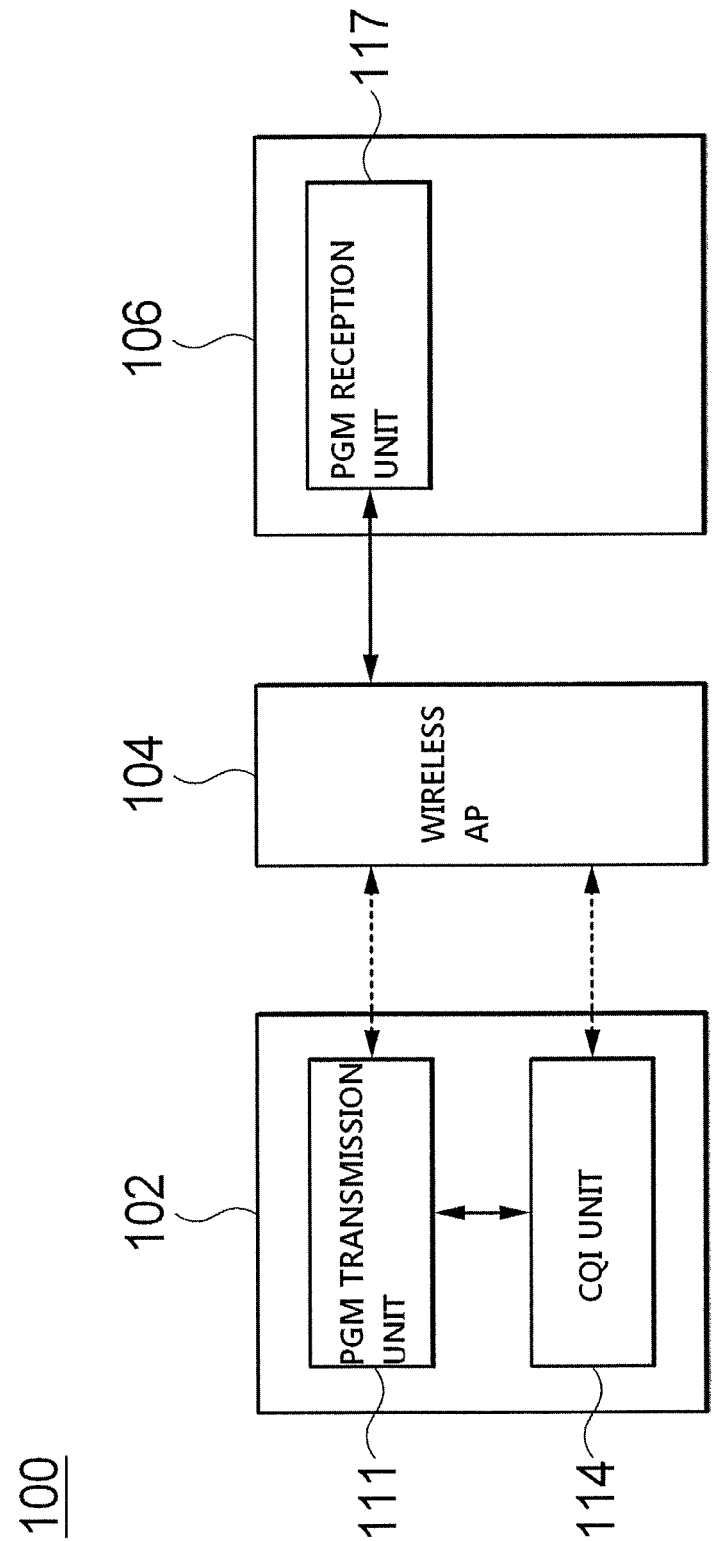
FIG. 2 is a block diagram of a system for monitoring a wireless network according to an exemplary embodiment of the present disclosure.
Figure 3:
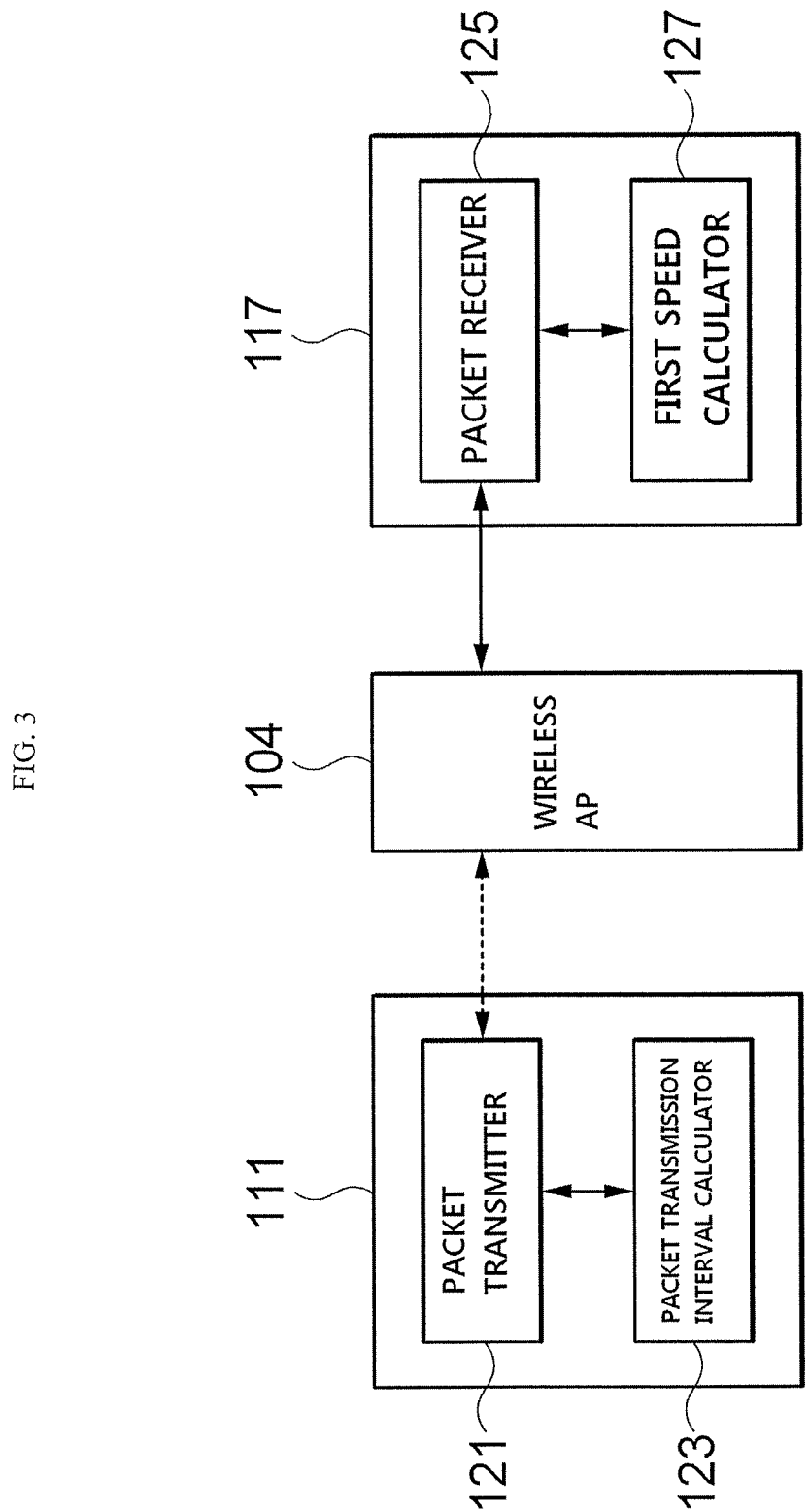
FIG. 3 is a block diagram of packet gap model (PGM)-related components in a system for monitoring a wireless network according to an exemplary embodiment of the present disclosure.
Figure 4:
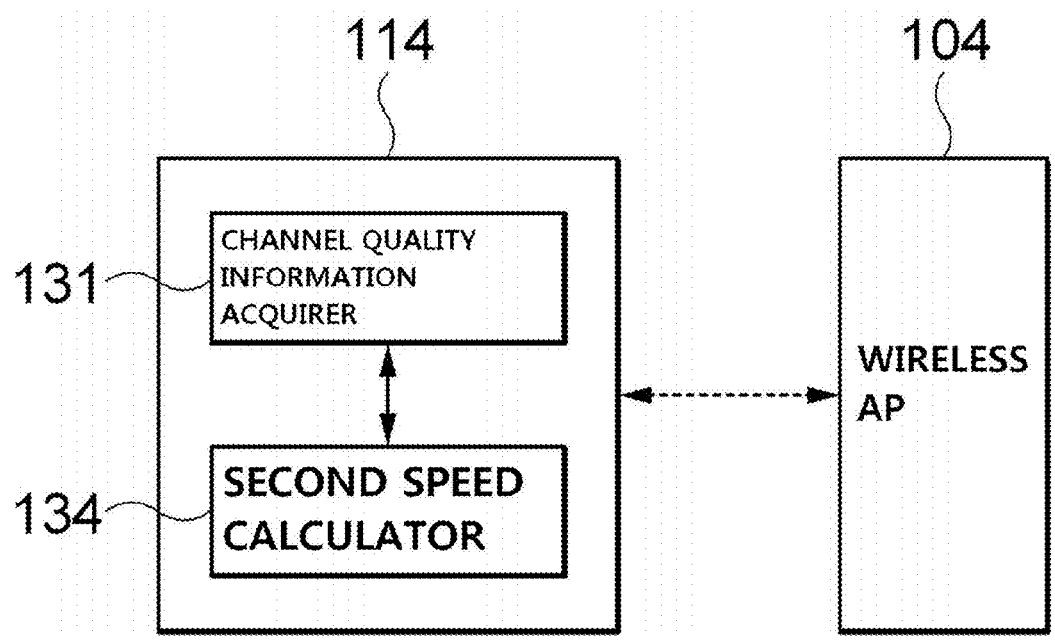
FIG. 4 is a block diagram of channel quality indicator (CQI)-related components in a system for monitoring a wireless network according to an exemplary embodiment of the present disclosure.

FIG. 2 is a block diagram of a system for monitoring a wireless network according to an exemplary embodiment of the present disclosure, FIG. 3 is a block diagram of PGM-related components in a system for monitoring a wireless network according to an exemplary embodiment of the present disclosure, and FIG. 4 is a block diagram of CQI-related components in a system for monitoring a wireless network according to an exemplary embodiment of the present disclosure.

As shown in FIGS. 2 to 4, a system 100 for monitoring a wireless network includes a first terminal 102, a wireless AP 104, and a second terminal 106. Here, a network section to be monitored is a section between the first terminal 102 and the second terminal 106.

The first terminal 102 may perform wireless communications directly with the wireless AP 104. In other words, there is a single hop between the first terminal 102 and the wireless AP 104. The second terminal 106 may be connected with the wireless AP 104 by wire. There may be one or more hops between the second terminal 106 and the wireless AP 104.

By way of explanation, the first terminal 102 is described as performing wireless network monitoring. Hereinafter, the first terminal 102 and the second terminal 106 are illustrated with only the components used for the wireless network monitoring performed by the first terminal 102, but other components may be incorporated thereinto. The present disclosure is not limited to the illustrated components, and, for example, the first terminal 102 and the second terminal 106 may include components necessary for the second terminal 106 to perform wireless network monitoring.

The first terminal 102 includes a PGM transmission unit 111 and a CQI unit 114. The second terminal 106 includes a PGM reception unit 117. The PGM transmission unit 111 and the PGM reception unit 117 measure a non-assured maximum possible speed of a network using a PGM scheme. Here, the PGM transmission unit 111 includes a packet transmitter 121 and a packet transmission interval calculator 123, and the PGM reception unit 117 includes a packet receiver 125 and a first speed calculator 127. The CQI unit 114 measures an assured maximum increment of speed of the network using a CQI scheme.

With reference to FIG. 3, an illustrative description of a method of measuring a non-assured maximum possible speed using the PGM scheme will be presented.

The packet transmitter 121 of the PGM transmission unit 111 transmits measurement packets for measuring a non-assured maximum possible speed to the second terminal 106. The measurement packets are delivered to the second terminal 106 via the wireless AP 104. Although the measurement packets may be separately generated to measure a non-assured maximum possible speed of the network, the measurement packets are not limited to packets generated to measure a non-assured maximum possible speed, and actual data packets of the corresponding service may be used as the measurement packets.

The packet transmitter 121 may transmit the measurement packets in the form of a pair or a train of packets. For example, the packet transmitter 121 may transmit two measurement packets in the form of a packet pair by attaching one of the measurement packets to the other, or may transmit a plurality of measurement packets in the form of a train at a predetermined time interval. In the latter case, the packet transmitter 121 adjusts the packet transmission time interval between the measurement packets according to the packet transmission time interval calculated by the packet transmission interval calculator 123.

In order that the non-assured maximum possible speed can be measured and obtained with high accuracy and reliability, the packet transmitter 121 uses information about how to adjust the transmission time interval between the measurement packets for transmitting the measurement packets. In other words, the interval between the measurement packets transmitted by the packet transmitter 121 may be widened according to communication capacity of a bottleneck point of the network, narrowed down or widened depending on which queue at each hop in the network is traversed, or widened according to cross traffic of other services sharing the network, thereby reflecting a degree of congestion of the network and the communication capacity of the bottleneck point. Thus, in order that the non-assured maximum possible speed of the network can be measured and obtained with high accuracy and reliability, the information about how to adjust the transmission time interval between measurement packets is useful when the packet transmitter 121 transmits the measurement packets.

Here, the packet transmission interval calculator 123 performs calculating a transmission time interval between measurement packets. The packet transmission interval calculator 123 may receive a part of channel quality information on the network from the CQI unit 114, and measure a transmission time interval between measurement packets. In other words, to calculate the transmission time interval between the measurement packets based on a state of the network, the packet transmission interval calculator 123 uses a part of the channel quality information on the network received from the CQI unit 114.

Specifically, a non-assured maximum possible speed indicates a maximum amount of data received per unit time by the receiving end, i.e., the second terminal 106. The amount of data received per unit time by the second terminal 106 varies according to a data transmission rate of the first terminal 102.

In general, when the first terminal 102 transmits data at a maximum transmission rate, the amount of data received per unit time by the second terminal 106 is maximized. However, even when the first terminal 102 transmits data at a maximum transmission rate, if there is a difference between the maximum transmission rate of the first terminal 102 and an actual transmission rate experienced in a network layer of the first terminal 102, a socket buffer of the packet transmitter 121 overflows with measurement packets, and the measurement packets are not processed normally.

Thus, to calculate an optimum transmission rate (i.e., optimum transmission time interval) between measurement packets based on a network state, it is necessary to take the difference between the maximum transmission rate of the first terminal 102 and the actual transmission rate experienced in the network layer of the first terminal 102 into consideration.

To this end, the packet transmission interval calculator 123 receives, from the CQI unit 114, a maximum transmission rate (bit rate) of a physical layer of the network, which is contained in the channel quality information, and calculates a transmission time interval between measurement packets. Here, when a transmission time interval between the measurement packets is referred to as $G_S$, the transmission time interval $G_S$ may be converted to a transmission rate $V_S$ as shown in Equation 1 below.

$$G_s = \frac{L}{V_s} \quad \text{[Equation 1]}$$

Here, L denotes a size of a transmitted packet, and $V_S$ denotes a transmission rate. The transmission rate $V_S$ may be calculated as shown in Equation 2 below.

$$V_s = C \times \frac{\alpha}{100} \quad \text{[Equation 2]}$$

Here, C denotes a maximum transmission rate of the physical layer of the network, and α denotes a ratio of a transmission rate experienced in the network layer of the first terminal 102 to a maximum transmission rate supported by the physical layer of the first terminal 102. C may be 54 Mbps when the underlying wireless network system follows IEEE 802.11g, and α generally ranges from 50 to 60%.

The packet transmission interval calculator 123 may initially calculate the transmission rate $V_S$ by inputting a default value between 50 to 60% as a value of α. However, as will be described later, the transmission rate $V_S$ may be calculated by receiving a corrected value of α from the CQI unit 114, and then substituting the corrected value of α into Equation 2.

As mentioned above, by using Equation 1 and Equation 2, the packet transmission interval calculator 123 can calculate an optimum transmission time interval $G_S$ between measurement packets based on a network state. The packet transmission interval calculator 123 delivers the transmission time interval between the measurement packets calculated using Equation 1 and Equation 2 to the packet transmitter 121. Then, the packet transmitter 121 transmits measurement packets to the second terminal 106 at the calculated transmission time interval $G_S$.

The packet receiver 125 of the second terminal 106 receives the measurement packets transmitted by the packet transmitter 121. The packet receiver 125 measures a reception time interval $G_R$ between the received measurement packets.

The first speed calculator 127 receives the reception time interval $G_R$ from the packet receiver 125 and calculates a reception rate $V_R$. The reception rate $V_R$ can be calculated using Equation 3 below. Here, the reception rate $V_R$ calculated by the first speed calculator 127 becomes a non-assured maximum possible speed $V_{PGM}$ of the network.

$$V_R = \frac{L}{G_R} = V_{PGM} \quad \text{[Equation 3]}$$

The first speed calculator 127 delivers the reception rate $V_R$ calculated using Equation 3, that is, the non-assured maximum possible speed $V_{PGM}$, to the packet receiver 125. Then, the packet receiver 125 may transmit the non-assured maximum possible speed $V_{PGM}$ to the first terminal 102. The first terminal 102 delivers the non-assured maximum possible speed $V_{PGM}$ received from the packet receiver 125 to a media engine (not shown) in the first terminal 102, thereby allowing the media engine to select a data source according to the non-assured maximum possible speed $V_{PGM}$.

Next, with reference to FIG. 4, an illustrative description of a method of measuring an assured maximum increment of speed will be presented.

A channel quality information acquirer 131 of the CQI unit 114 acquires channel quality information of a wireless communication channel connecting the first terminal 102 with the wireless AP 104. Here, the wireless AP 104 may be, for example, a wireless Internet sharer or a router, but is not limited thereto.

The channel quality information acquired by the channel quality information acquirer 131 includes at least one of, for example, a maximum transmission rate (bit rate) of a physical layer of the network, a channel active time, a channel busy time, a signal level, and a noise level. The channel quality information acquirer 131 may acquire the channel quality information directly or through a network driver (or LAN card), etc. of the first terminal 102. The channel quality information acquirer 131 delivers the acquired channel quality information to a second speed calculator 134.

The second speed calculator 134 calculates an assured maximum increment of speed of the network using the channel quality information received from the channel quality information acquirer 131. Here, the assured maximum increment of speed denotes a maximum speed-up available for one of services with respect to a current network speed for the services without any change in the other services, and thus can be calculated using a maximum transmission rate that can be currently achieved by the network layer of the first terminal 102 and a ratio of a time for which the wireless communication channel over which the first terminal 102 is connected with the wireless AP 104 is not used for communications (i.e., a residual time ratio).

In other words, the second speed calculator 134 can calculate an assured maximum increment of speed $V_{CQI}$ of the network as shown in Equation 4 below.

$$V_{CQI} = \left(C \times \frac{\alpha}{100}\right) \times (1 - \text{Channel Utilization}) \quad \text{[Equation 4]}$$

Here, C denotes the maximum transmission rate of the network, α denotes a ratio of a transmission rate experienced in the network layer of the first terminal 102 to a maximum transmission rate supported by a physical layer of the first terminal 102, and thus $$C \times \frac{\alpha}{100}$$

denotes the maximum transmission rate that can be currently achieved by the network layer of the first terminal 102.

A channel utilization of the wireless communication channel over which the first terminal 102 is connected with the wireless AP 104 can be calculated as shown in Equation 5 below.

$$\text{Channel Utilization} = \frac{\text{Channel Busy Time}}{\text{Channel Active Time}},$$ [Equation 5]

$$0 \le \text{Channel Utilization} \le 1$$

Here, the channel active time denotes a time for which the first terminal 102 and the wireless AP 104 can communicate with each other, and the channel busy time denotes a time for which the wireless communication channel over which the first terminal 102 is connected with the wireless AP 104 is used by traffic. As a result, the channel utilization denotes a ratio of a time for which the wireless communication channel over which the first terminal 102 is connected with the wireless AP 104 is used for communications. Thus, 1-channel utilization denotes a ratio of a time for which the wireless communication channel over which the first terminal 102 is connected with the wireless AP 104 is not used for communication, that is, the residual time ratio.

In Equation 4, $\alpha$ generally has a ratio of 50 to 60%, but may vary according to a development method, a control option, etc. for the wireless AP 104. Thus, to improve accuracy and reliability of measurement results of the assured maximum increment of speed $V_{CQI}$, it is necessary to correct a value of $\alpha$ and use the corrected value of $\alpha$. Here, to correct the value of $\alpha$, the second speed calculator 134 uses the result values calculated by the PGM transmission unit 111 and the PGM reception unit 117.

Specifically, to correct the value of $\alpha$, it is necessary to obtain a maximum transmission rate actually experienced in the network layer of the first terminal 102, and to obtain the maximum transmission rate experienced in the network layer of the first terminal 102, it is necessary for the transmitting side, that is, the first terminal 102, to transmit measurement packets at a maximum transmission rate available in the network. Here, for transmission of the measurement packets at the maximum transmission rate available in the network, a transmission time interval between the measurement packets may be minimized (e.g., the transmission time interval is set to 0).

For example, the PGM transmission unit 111 transmits the measurement packets to the second terminal 106 at a transmission time interval of 0. Then, the PGM reception unit 117 measures a reception interval between the measurement packets to calculate a reception rate V. The PGM reception unit 117 transmits the calculated reception rate V to the first terminal 102. Here, the reception rate V is the maximum transmission rate actually experienced in the network layer of the first terminal 102. In this case, the second speed calculator 134 can correct the value of $\alpha$ as shown in Equation 6 below.

$$\alpha = \frac{V}{C} \times 100$$ [Equation 6]

The second speed calculator 134 calculates the assured maximum increment of speed $V_{CQI}$ of the corresponding network by substituting the value of $\alpha$ corrected using Equation 6 into Equation 4. The PGM transmission unit 111 may periodically transmit measurement packets to the second terminal 106 at a transmission time interval of 0, thereby periodically updating the value of $\alpha$. Every time the value of $\alpha$ is updated, the packet transmission interval calculator 123 may substitute the corrected value of $\alpha$ into Equation 2 to calculate the transmission rate $V_S$. Meanwhile, the first terminal 102 may deliver the assured maximum increment of speed $V_{CQI}$ calculated by the second speed calculator 134 to the media engine (not shown) in the first terminal 102, thereby allowing the media engine to select a data source according to the assured maximum increment of speed $V_{CQI}$.

In exemplary embodiments of the present disclosure, an optimum transmission time interval between measurement packets is calculated in consideration of a network state using channel quality information provided by the CQI unit 114, and the measurement packets are transmitted at the optimum transmission time interval, such that an accurate and reliable non-assured maximum possible speed can be calculated based on the network state according to the PGM scheme.

In addition, a value of a reception rate of measurement packets transmitted at a minimum transmission time interval is received from the PGM transmission unit 111 to correct a value of $\alpha$, such that an accurate and reliable assured maximum increment of speed can be calculated based on a network state according to the CQI scheme.

As described above, network monitoring is performed through a cooperative combination of the PGM scheme and the CQI scheme so that a non-assured maximum available speed and an assured maximum increment of speed available for a service can be recognized rapidly and accurately. In addition, such network monitoring provides a way of maintain quality of service (QoS) in various network environments and states, with more flexibility in doing so.

For example, when a non-assured maximum available speed and an assured maximum increment of speed are calculated through such combination of the PGM scheme and the CQI scheme in a videophone service, the calculated speeds provides a guideline to select one of low-quality video (e.g., 700 Kbps) and high-quality video (e.g., 1,200 Kbps) for transmission. If a non-assured maximum available speed and an assured maximum increment of speed are calculated to be 1,300 Kbps and 200 Kbps, respectively while the low-quality video (700 Kbps) is currently being transmitted, video of about 900 Kbps (700 Kbps+200 Kbps) can be stably transmitted without affecting other services, and also an attempt may be made to transmit video of a maximum of 1,300 Kbps. Here, a video provider may continuously transmit the low-quality video of 700 Kbps to achieve the stability of the service, or may transmit the high-quality video of 1,200 Kbps to provide video of better quality.

Figure 5:
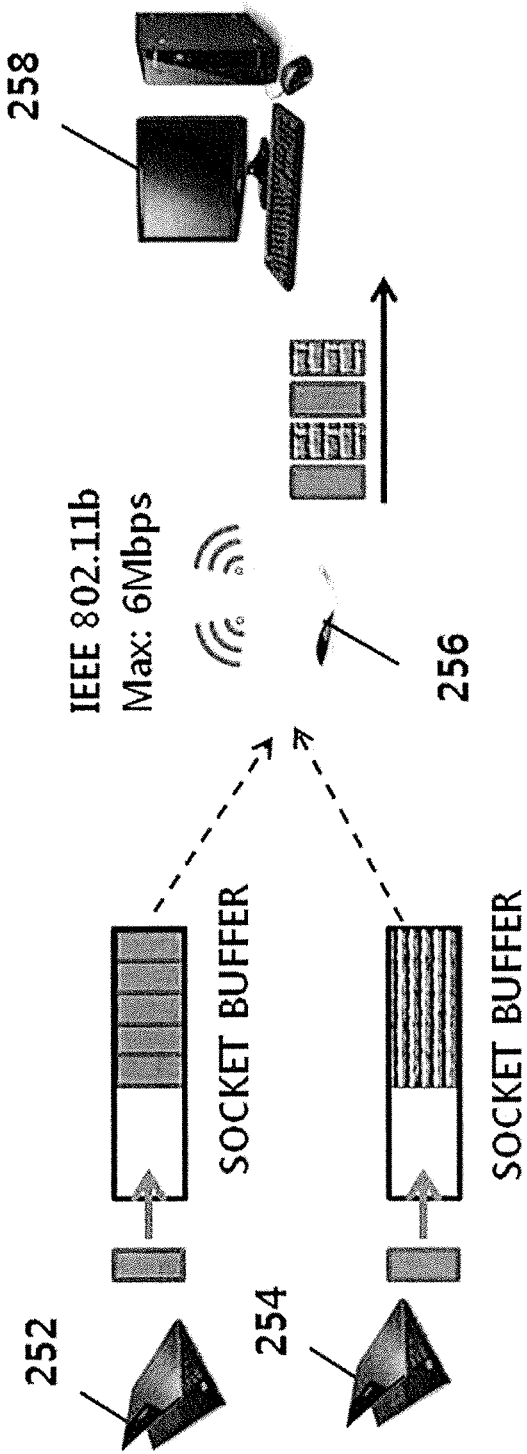
FIG. 5 illustrates a test condition for comparing a measured performance of an assured maximum increment of speed according to a CQI scheme of the present disclosure with a measured performance of an assured maximum increment of speed according to an existing PGM scheme.
Figure 6:
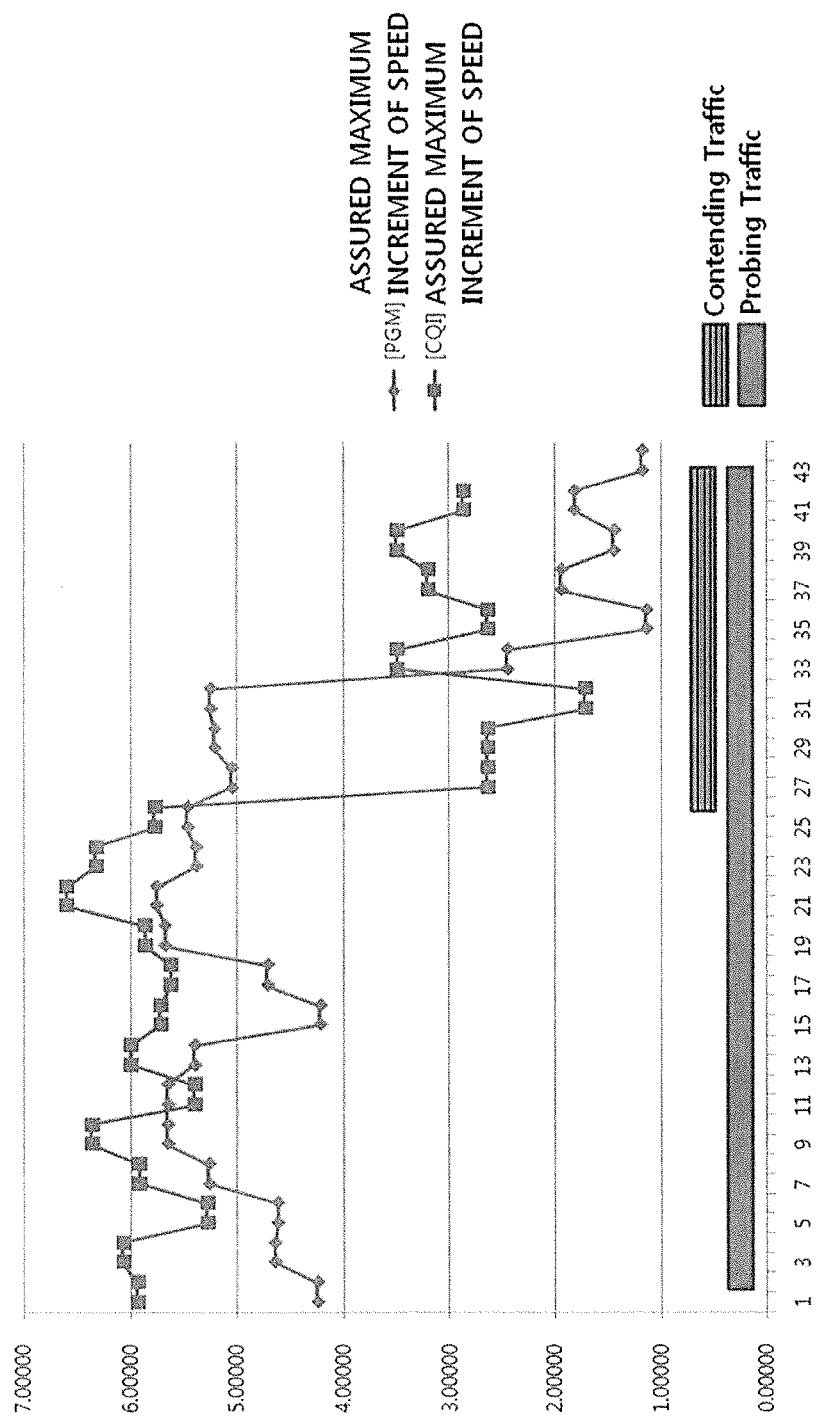
FIG. 6 is a graph for comparing a measured performance of an assured maximum increment of speed according to a CQI scheme of the present disclosure with a measured performance of an assured maximum increment of speed according to an existing PGM scheme.

FIG. 5 illustrates a test condition for comparing a measured performance of an assured maximum increment of speed according to a CQI scheme of the present disclosure with a measured performance of an assured maximum increment of speed according to an existing PGM scheme, and FIG. 6 is a graph for comparing a measured performance of an assured maximum increment of speed according to a CQI scheme of the present disclosure with a measured performance of an assured maximum increment of speed according to an existing PGM scheme. In FIG. 6, a horizontal axis denotes a sequence of packets transmitted at a predetermined time interval, and a vertical axis denotes an assured maximum increment of speed (bps).

As shown in to FIG. 5, a first laptop computer 252 and a second laptop computer 254 connect to a same wireless AP 256. The first laptop computer 252 is equipment for generating contending traffic, and the second laptop computer 254 is equipment for generating measurement packets. Here, a maximum bandwidth of a network layer of the wireless AP 256 is 6 Mbps.

The assured maximum increment of speed is measured for initial 20 seconds during which only the second laptop computer 254 is operating (i.e., with no contending traffic generated) and for subsequent 20 seconds during which the first laptop computer 252 is operating as well to generate contending traffic. Thus, the assured maximum increment of speed is expected to be measured as 6 Mbps for the initial 20 seconds and 3 Mbps for the subsequent 20 seconds.

Referring to FIG. 6, when an assured maximum increment of speed is measured using the existing PGM scheme, it is found that the measured assured maximum increment of speed is lower than the estimated value for the initial time period for which no contending traffic is generated (i.e., 6 Mbps), and the estimated value for the subsequent time period for which contending traffic is generated (i.e., 3 Mbps). This is because the PGM scheme involves transmission of measurement packets, and more specifically, due to the characteristics of the PGM scheme, there would be a delay between transmission of the measurement packets on a transmitting end and reception of the measurement packets on a receiving end.

On the other hand, when an assured maximum increment of speed is measured using the CQI scheme, it is found that the measured assured maximum increment of speed is similar to the estimated value of the initial time period for which no contending traffic is generated (i.e., 6 Mbps), and the estimated value of the subsequent time period for which contending traffic is generated (i.e., 3 Mbps). In other words, it can be recognized that the CQI scheme shows more accurate measurement results than the PGM scheme. This is because, unlike the PGM scheme, the CQI scheme does not involve transmission of measurement packets for measuring an assured maximum increment of speed and causes almost no delay.

Further, when an assured maximum increment of speed is measured using the existing PGM scheme, the measured assured maximum increment of speed shows great variation, and when an assured maximum increment of speed is measured using the CQI scheme, the measured assured maximum increment speed shows less variation than that measured using the PGM scheme. This will be described in further detail with reference to FIG. 7. FIG. 7 is a table for comparing a variance of an assured maximum increment of speed according to the CQI scheme of the present disclosure with a variance of an assured maximum increment of speed according to the existing PGM scheme. Referring to FIG. 7, it can be recognized that, regardless of whether or not there is cross traffic, a variance of an assured maximum increment of speed according to the existing PGM scheme is greater than a variance of an assured maximum increment of speed according to the CQI scheme of the present disclosure. This is due to the characteristics of a wireless communication system in accordance with the existing PGM scheme, i.e., that the wireless communication system waits for a random time to transmit each measurement packet. Since a variation of a rate of the measurement packet transmission is large, the variation of the assured maximum increment of speed is also large.

Still further, it is found that an assured maximum increment of speed is measured using the existing PGM scheme and a response time is longer than when the assured maximum increment of speed is measured using the CQI scheme. In other words, when an assured maximum increment of speed is measured with no contending traffic generated for initial 20 seconds and is measured with contending traffic generated for subsequent 20 seconds, the assured maximum increment of speed measured according to the PGM scheme reaches 3 Mbps or less after a certain time period (of, e.g., about seven sequences) since the generation of the contending traffic, but the assured maximum increment of speed measured according to the CQI scheme reaches 3 Mbps or less as soon as the contending traffic is generated. Thus, the CQI scheme responds to a network environment with more rapidity and sensitivity than the existing PGM scheme.

Here, the PGM scheme for measuring an assured maximum increment of speed shows a longer response time since a predetermined number of sets of measurement packets are required to be transmitted in the form of a pair or a train of packets so that an error in calculating, at a receiving end, the assured maximum increment of speed may be reduced. In other words, to calculate the assured maximum increment of speed on the receiving side, it is necessary to wait until the predetermined number of sets of measurement packets are gathered. Due to the resulting additional delay occurs, the response time in the network monitoring according to the PGM scheme is increased.

In exemplary embodiments of the present disclosure, network monitoring is performed using the PGM scheme and the CQI scheme in a complementary manner, instead of using the PGM scheme alone, thereby providing more accurate, rapid, and reliable network monitoring results compared to the PGM scheme.

Figure 8:
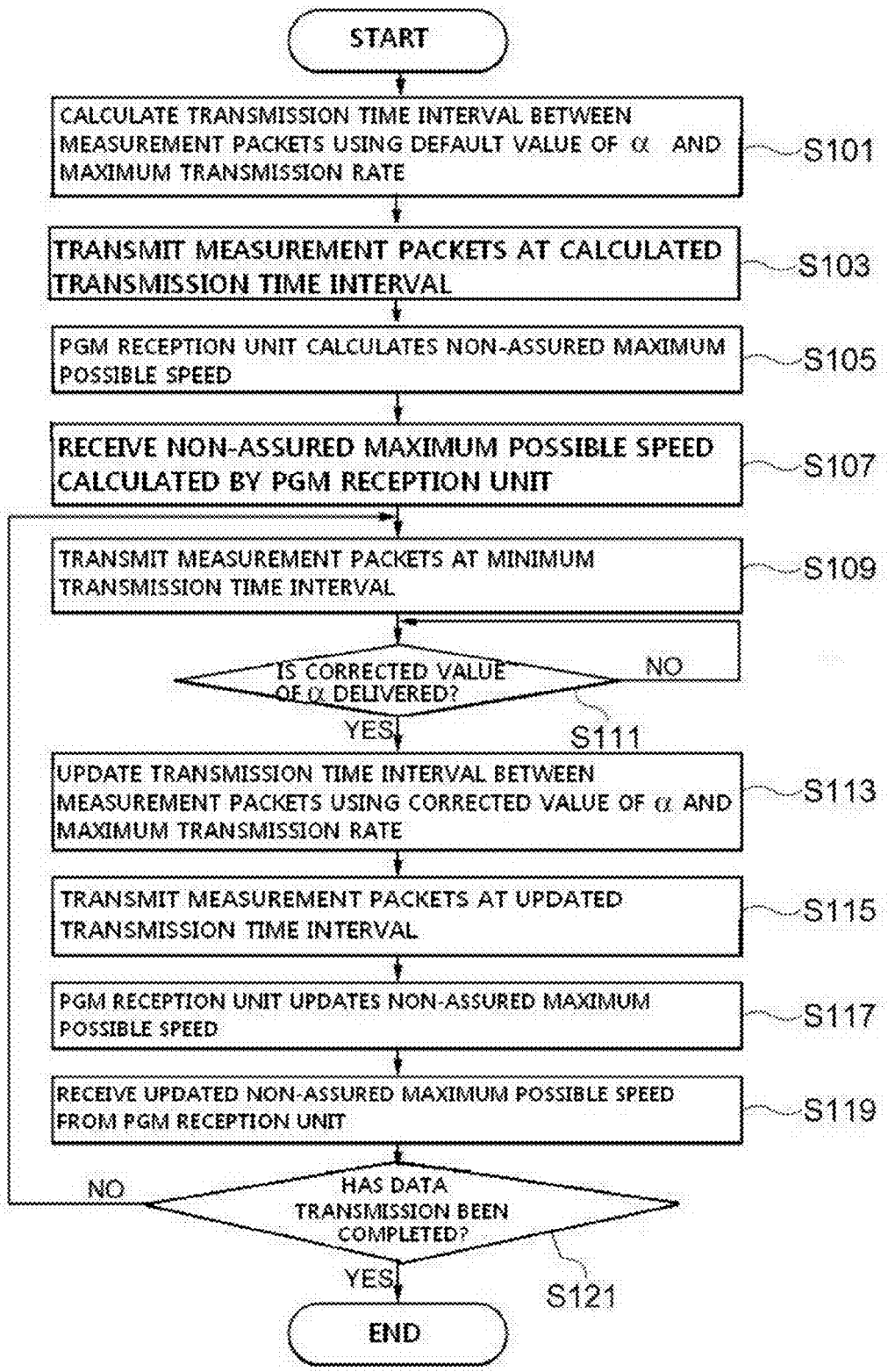
FIG. 8 is a flowchart illustrating a method of calculating a non-assured maximum possible speed using a PGM scheme according to an exemplary embodiment of the present disclosure.

FIG. 8 is a flowchart illustrating a method of calculating a non-assured maximum possible speed using a PGM scheme according to an exemplary embodiment of the present disclosure.

As shown in FIG. 8, a PGM transmission unit 111 receives a default value of cc and a maximum transmission rate (bit rate) of a physical layer of a network, which rate is contained in channel quality information from a CQI unit 114, and calculates a transmission time interval between measurement packets (S101). The PGM transmission unit 111 may calculate the transmission time interval between measurement packets using Equation 1 and Equation 2 described above. At this time, the PGM transmission unit 111 may substitute a value of 60% into Equation 2 as the default value of $\alpha$.

Next, the PGM transmission unit 111 transmits measurement packets to a PGM reception unit 117 at the calculated transmission time interval (S103). At this time, the PGM transmission unit 111 may transmit the measurement packets in the form of packet pairs. However, transmission of measurement packets is not limited to the form of packet pairs, and measurement packets may be transmitted in the form of a packet train.

Next, the PGM reception unit 117 measures a reception interval between the measurement packets and calculates a non-assured maximum possible speed $V_{PGM}$ of the network (S105). At this time, the PGM reception unit 117 may calculate the non-assured maximum possible speed $V_{PGM}$ using Equation 3 described above.

Next, the PGM transmission unit 111 receives the non-assured maximum possible speed $V_{PGM}$ from the PGM reception unit 117 (S107). At this time, the PGM transmission unit 111 delivers the received non-assured maximum possible speed $V_{PGM}$ to a media engine (not shown) of a first terminal 102, thereby allowing the media engine to select a data source according to the non-assured maximum possible speed $V_{PGM}$.

Next, the PGM transmission unit 111 transmits measurement packets to the PGM reception unit 117 at a minimum transmission time interval (S109). At this time, the PGM reception unit 117 calculates a reception rate V using a reception interval between the measurement packets, and then transmits the reception rate V to the first terminal 102. Here, the reception rate V is a maximum transmission rate that is actually experienced in a network layer of the first terminal 102, and the value of α can be corrected according to a current network state using the reception rate V.

Next, the PGM transmission unit 111 checks whether or not the corrected value of α (i.e., updated value of α) is delivered from the CQI unit 114 (S111). In other words, the CQI unit 114 receives the reception rate V transmitted from the PGM reception unit 117 (i.e., a reception rate of the measurement packets transmitted at a minimum transmission time interval) to correct the value of α, and delivers the corrected value of α to the PGM transmission unit 111. At this time, the CQI unit 114 may correct the value of α using Equation 6 described above.

When it is checked in step 111 that the corrected value of α is delivered from the CQI unit 114, the PGM transmission unit updates the transmission time interval between measurement packets using the corrected value of α (S113). In other words, the PGM transmission unit 111 calculates an updated transmission time interval between measurement packets by substituting the corrected value of α into Equation 2 described above.

Next, the PGM transmission unit 111 transmits measurement packets to the PGM reception unit 117 at the updated transmission time interval (S115).

Next, the PGM reception unit 117 measures a reception interval between the measurement packets and updates the non-assured maximum possible speed $V_{PGM}$ (S117).

Next, the PGM transmission unit 111 receives the updated non-assured maximum possible speed $V_{PGM}$ from the PGM reception unit 117 (S119). At this time, the PGM transmission unit 111 delivers the updated non-assured maximum possible speed $V_{PGM}$ to the media engine (not shown) of the first terminal 102, thereby causing the media engine to select a data source according to the updated non-assured maximum possible speed $V_{PGM}$.

Next, the PGM transmission unit 111 checks whether or not data transmission has been completed (S121). When data transmission has not been completed, the process is returned to step 109, and the subsequent steps are performed again.

Although it has been described above that step 109 is performed after step 107 for convenience, a sequence of the process is not limited to the foregoing, and step 109 may be performed after step 103.

In this way, a transmission time interval between measurement packets is periodically updated using a value of α corrected by the CQI unit 114 in a process of calculating a non-assured maximum possible speed according to the PGM scheme, such that accurate and reliable network monitoring results can be obtained with a network state periodically taken into consideration.

Figure 9:
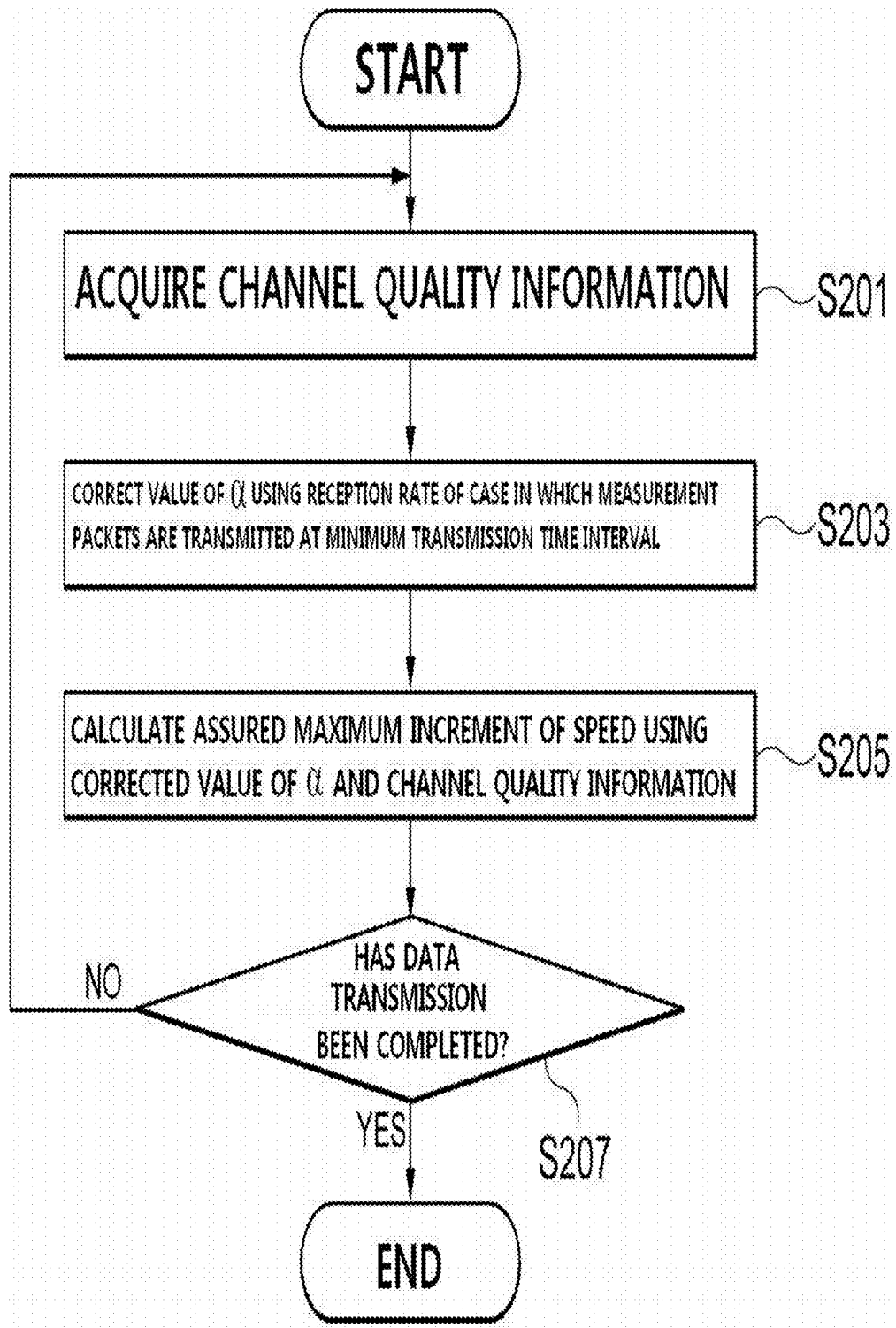
FIG. 9 is a flowchart illustrating a method of calculating an assured maximum increment of speed using a CQI scheme according to an exemplary embodiment of the present disclosure.

FIG. 9 is a flowchart illustrating a method of calculating an assured maximum increment of speed using the CQI scheme according to an exemplary embodiment of the present disclosure.

As shown in FIG. 9, a CQI unit 114 acquires channel quality information on a wireless communication channel over which a first terminal 102 is connected with a wireless AP 104 (S201). At this time, the CQI unit 114 may acquire the channel quality information including a maximum transmission rate (bit rate) of a physical layer of the corresponding network, a channel active time, and a channel busy time.

Next, the CQI unit 114 corrects a value of α using a reception rate V of measurement packets transmitted at a minimum transmission time interval (S203). In other words, when a PGM transmission unit 111 transmits measurement packets at the minimum transmission time interval, the PGM reception unit 117 calculates the reception rate V using a reception interval between the measurement packets, and then transmits the calculated reception rate V to the first terminal 102. Here, the CQI unit 114 corrects the value of α using the reception rate V calculated by the PGM reception unit 117. The CQI unit 114 may correct the value of α using Equation 6 described above. The CQI unit 114 may deliver the corrected value of α to the PGM transmission unit 111.

Next, the CQI unit 114 calculates an assured maximum increment of speed $V_{CQI}$ of the network using the corrected value of α and the channel quality information (i.e., the maximum transmission rate of the network, the channel active time, and the channel busy time) (S205). At this time, the CQI unit 114 may calculate the assured maximum increment of speed $V_{CQI}$ of the network using Equation 4 and Equation 5 described above. The CQI unit 114 may deliver the calculated assured maximum increment of speed $V_{CQI}$ to a media engine (not shown) of the first terminal 102, thereby allowing the media engine to select a data source according to the calculated assured maximum increment of speed $V_{CQI}$.

Next, the CQI unit 114 checks whether or not data transmission has been completed (S207), and when data transmission has not been completed, the process is returned to step 201, and the subsequent steps are performed again. Here, since the reception rate V of the measurement packets are transmitted at a minimum transmission time interval varies according to a network state, the CQI unit 114 corrects the value of α and updates the assured maximum increment of speed $V_{CQI}$.

Although it has been described above that channel quality information is acquired in step 201 for convenience, acquisition of channel quality information is not limited to step 201, and channel quality information may be acquired any time before step 205.

In this way, when the PGM transmission unit 111 transmits measurement packets at a minimum transmission time interval, a reception rate is periodically received from the PGM reception unit 117 to correct (or update) a value of α in a process of calculating an assured maximum increment of speed according to the CQI scheme, such that accurate and reliable network monitoring results can be obtained with a network state periodically taken into consideration.

In exemplary embodiments of the present disclosure, network monitoring is performed by cooperatively employing the PGM scheme and the CQI scheme so that a non-assured maximum possible speed and an assured maximum increment of speed available for a service can be obtained rapidly and accurately. In addition, such network monitoring provides a way of maintaining QoS in various network environments and states, with more flexibility in doing so.

It will be apparent to those familiar with this field that various modifications can be made to the above-described exemplary embodiments of the present disclosure without departing from the spirit or scope of the present disclosure. Thus, it is intended that the present disclosure covers all such modifications that fall within the scope of the appended claims and their equivalents.

What is claimed is:

1. A terminal, intended for use in performing data communications with another terminal through a wireless access point over a network, comprising a computing device with a transmitter and a receiver, the terminal implementing:
- a packet gap model (PGM) unit, implemented by the computing device, configured to:
  - transmit a plurality of measurement packets to the said another terminal at a previously calculated transmission time interval; and
  - receive, from the other terminal, a value of a non-assured maximum possible speed of the network; and
- a channel quality indicator (CQI) unit, implemented by the computing device, configured to acquire information regarding channel quality of a wireless communication channel over which the terminal is connected with the wireless access point to measure an assured maximum increment of speed of the network,
- wherein the PGM unit uses a corrected value of α, wherein the corrected value of α is a ratio of: a transmission rate experienced in a network layer of the terminal, to a maximum transmission rate supported by a physical layer of the terminal, received from the CQI unit to calculate a transmission time interval.

2. The terminal of claim 1, wherein:
the PGM unit is further configured to:
- receive, from the CQI unit, a value of a maximum transmission rate of a physical layer of the network; and
- calculate the transmission time interval based on the value of the maximum transmission rate; and the value of the maximum transmission rate is contained in the channel quality information.

3. The terminal of claim 2, wherein the PGM unit is further configured to calculate the transmission time interval using the following equation:

$$G_S = \frac{100L}{C \times \alpha}$$

where:
$G_S$ denotes a transmission time interval,
L denotes a size of a measurement packet,
C denotes a maximum transmission rate of a physical layer of a network, and
α denotes a ratio of a transmission rate experienced in a network layer of a terminal to a maximum transmission rate supported by a physical layer of the terminal.

4. The terminal of claim 1, wherein the CQI unit is further configured to calculate the assured maximum increment of speed using the following equation:

$$V_{CQI} = \left(C \times \frac{\alpha}{100}\right) \times (1 - \text{Channel Utilization})$$

where:
$V_{CQI}$ denotes an assured maximum increment of speed,
C denotes a maximum transmission rate of a physical layer of a network, and
α denotes a ratio of a transmission rate experienced in a network layer of a terminal to a maximum transmission rate supported by a physical layer of the terminal.

5. The terminal of claim 4, wherein the CQI unit is further configured to correct a value of α using a value of a reception rate of the measurement packets transmitted by the PGM unit at minimum intervals.

6. The terminal of claim 5, wherein the PGM unit is further configured to receive, from the CQI unit, the value of the maximum transmission rate of the physical layer of the network and the corrected value of α to calculate the transmission time interval.

7. A system for monitoring a wireless network, comprising:
- a first terminal including:
  - a packet gap model (PGM) transmission unit configured to transmit a plurality of measurement packets at a previously calculated transmission time interval; and
  - a channel quality indicator (CQI) unit configured to acquire information regarding channel quality of a wireless communication channel to measure an assured maximum increment of speed of the network;
- a second terminal including a PGM reception unit configured to:
  - receive the measurement packets; and
  - measure a non-assured maximum possible speed of the network from a reception time interval of the received measurement packets; and
- a wireless access point connected with the first terminal through the wireless communication channel,
- wherein the PGM transmission unit uses a corrected value of α, wherein the corrected value of α is a ratio of: a transmission rate experienced in a network layer of the terminal, to a maximum transmission rate supported by a physical layer of the terminal, received from the CQI unit to calculate a transmission time interval.

8. The system of claim 7, wherein the PGM transmission unit is further configured to:
- receive, from the CQI unit, a value of a maximum transmission rate of a physical layer of the network; and
- calculate the transmission time interval, based on the value of the maximum transmission rate;
- wherein the value of the maximum transmission rate is contained in the channel quality information.

9. The system of claim 8, wherein the PGM transmission unit is further configured to calculate the transmission time interval using the following equation:

$$G_S = \frac{100L}{C \times \alpha}$$

where:
$G_S$ denotes a transmission time interval,
L denotes a size of a measurement packet,
C denotes a maximum transmission rate of a physical layer of a network, and
α denotes a ratio of a transmission rate experienced in a network layer of a terminal to a maximum transmission rate supported by a physical layer of the terminal.

10. The system of claim 7, wherein the CQI unit is further configured to calculate the assured maximum increment of speed using the following equation:

$$V_{CQI} = \left(C \times \frac{\alpha}{100}\right) \times (1 - \text{Channel Utilization})$$

where:
$V_{CQI}$ denotes an assured maximum increment of speed,
C denotes a maximum transmission rate of a physical layer of a network, and
α denotes a ratio of a transmission rate experienced in a network layer of a terminal to a maximum transmission rate supported by a physical layer of the terminal.

11. The system of claim 10, wherein the CQI unit is further configured to correct a value of $\alpha$ using a value of a reception rate of the measurement packets transmitted by the PGM transmission unit at minimum intervals.

12. The system of claim 11, wherein the PGM transmission unit is further configured to receive, from the CQI unit, the value of the maximum transmission rate of the physical layer of the network and the corrected value of $\alpha$ to calculate the transmission time interval.

13. The system of claim 7, wherein the PGM reception unit is further configured to transmit the value of the non-assured maximum possible speed of the network to the PGM transmission unit.

14. A method of monitoring a wireless network, comprising:
  calculating, with a packet gap model (PGM) transmission unit, a transmission time interval between measurement packets based on:
    a default value of $\alpha$, which is a ratio of a transmission rate experienced in a network layer of a terminal to a maximum transmission rate supported by a physical layer of the terminal, and a corrected value of $\alpha$, and
    a value of a maximum transmission rate of a physical layer of the network,
    wherein the value of the maximum transmission rate and the corrected value of $\alpha$ are received from a channel quality indicator (CQI) unit;
  transmitting, with the PGM transmission unit, the measurement packets to a PGM reception unit at the calculated transmission time interval; and
  measuring, with the PGM reception unit, a reception interval between the measurement packets to calculate a non-assured maximum possible speed of the network.

15. The method of claim 14, further comprising, after transmitting the measurement packets to the PGM reception unit:
  transmitting, with the PGM transmission unit, measurement packets to the PGM reception unit at a minimum transmission time interval;
  checking, with the PGM transmission unit, whether or not a corrected value of $\alpha$ is delivered from the CQI unit;
  when the corrected value of a is delivered from the CQI unit, updating, at the PGM transmission unit, the transmission time interval between measurement packets using:
    the corrected value of $\alpha$, and
    the value of the maximum transmission rate of the physical layer of the network;
  transmitting, with the PGM transmission unit, measurement packets to the PGM reception unit at the updated transmission time interval; and
  measuring, with the PGM reception unit, a reception interval between the measurement packets to update the non-assured maximum possible speed.

16. A method of monitoring a wireless network, comprising:
  correcting, using a channel quality indicator (CQI) unit of a terminal having a computing device with a transmitter and a receiver, a value of $\alpha$, which is a ratio of a transmission rate experienced in a network layer of a terminal to a maximum transmission rate supported by a physical layer of the terminal, using a value of a reception rate of measurement packets transmitted at minimum transmission time intervals, wherein the value of the reception rate is received from a packet gap model (PGM) reception unit; and
  calculating, at the CQI unit, an assured maximum increment of speed of the network using a corrected value of $\alpha$ is and acquired information regarding channel quality of a wireless channel.

17. The method of claim 16, wherein calculating the assured maximum increment of speed includes:
  acquiring, with the CQI unit, a maximum transmission rate of a physical layer of the network, a channel active time, and a channel busy time contained in the channel quality information; and
  calculating, with the CQI unit, the assured maximum increment of speed based on the corrected value of $\alpha$, the maximum transmission rate of the physical layer of the network, the channel active time, and the channel busy time.

\* \* \* \* \*